United States Patent
Wall et al.

(10) Patent No.: US 10,488,653 B2
(45) Date of Patent: Nov. 26, 2019

(54) DISPLAY ALIGNMENT TRACKING IN DISPLAY SYSTEMS

(71) Applicant: Microsoft Technology Licensing, LLC, Redmond, WA (US)

(72) Inventors: Richard A. Wall, Kirkland, WA (US); Dmitry Reshidko, Redmond, WA (US); Joseph Lowney, Bothell, WA (US); Richard A. James, Woodinville, WA (US); Steven J. Robbins, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 15/816,770

(22) Filed: Nov. 17, 2017

(65) Prior Publication Data
US 2019/0155021 A1    May 23, 2019

(51) Int. Cl.
*G02B 26/12* (2006.01)
*G02B 26/08* (2006.01)
*G02B 26/10* (2006.01)
*G02B 27/00* (2006.01)
*G02B 27/01* (2006.01)
(Continued)

(52) U.S. Cl.
CPC ......... *G02B 26/121* (2013.01); *G02B 26/085* (2013.01); *G02B 26/101* (2013.01); *G02B 26/105* (2013.01); *G02B 27/0093* (2013.01); *G02B 27/0172* (2013.01); *G02B 27/22* (2013.01); *H04N 3/08* (2013.01); *G02B 2027/0178* (2013.01)

(58) Field of Classification Search
CPC .................................................. G02B 26/121
See application file for complete search history.

(56) References Cited

U.S. PATENT DOCUMENTS

| 7,952,781 | B2 | 5/2011 | Weiss et al. |
| 8,629,815 | B2 | 1/2014 | Brin et al. |
| 10,089,515 | B2 * | 10/2018 | Luo ...................... G06K 9/0004 |

(Continued)

OTHER PUBLICATIONS

"International Search Report and Written Opinion Issued in PCT Application No. PCT/US2018/059294", dated Feb. 19, 2019, 9 Pages.

*Primary Examiner* — Nelson M Rosario
*Assistant Examiner* — Scott D Au
(74) *Attorney, Agent, or Firm* — Ranjeev Singh; Singh Law, PLLC (57) ABSTRACT

Devices, systems, and methods corresponding to addressing misalignment in display systems are provided. A method includes using a first microelectromechanical system (MEMS) mirror, directing a first signal from a first light source to an alignment tracking waveguide. The method further includes receiving by a first photosensor a first portion of the first signal via the alignment tracking waveguide and determining a first alignment indicator associated with the first portion of the first signal. The method further includes using a second MEMS mirror, directing a second signal from a second light source to the alignment tracking waveguide. The method further includes receiving by a second photosensor a second portion of the second signal via the alignment tracking waveguide and determining a second alignment indicator associated with the second portion of the second signal.

20 Claims, 8 Drawing Sheets

(51) Int. Cl.
*H04N 3/08* (2006.01)
*G02B 27/22* (2018.01)

(56) References Cited

U.S. PATENT DOCUMENTS

| | | | |
|---|---|---|---|
| 2013/0135588 A1* | 5/2013 | Popovich | G02B 27/26 353/8 |
| 2015/0103404 A1* | 4/2015 | Rudy | G02B 6/00 359/567 |
| 2016/0116741 A1 | 4/2016 | Sato | |
| 2016/0209648 A1 | 7/2016 | Haddick et al. | |
| 2017/0255016 A1* | 9/2017 | Tinch | G02B 6/3518 |

* cited by examiner

DISPLAY ALIGNMENT TRACKING IN DISPLAY SYSTEMS

BACKGROUND

Display systems, including virtual reality systems, allow a user to visualize digital worlds. Mixed reality systems bring people, places, and objects from both physical and digital worlds together. As an example, a mixed reality system may allow a user to interact with virtual objects, including holograms and thus enabling a user of the system to visualize and work with digital content as part of the real world. Users may drag and drop holograms as part of their view of the real world.

Virtual and mixed reality systems can be implemented using head mounted displays that can project the virtual digital content in front of the user's eyes. In such systems, to create a depth of perception, both signals from a left display module and a right display module are combined to create a simulated view for the user. Any lack of alignment between the left and right signals can create an inferior user experience. Accordingly, there is a need for systems and methods for display alignment tracking.

SUMMARY

In one example, the present disclosure relates to a method in a device comprising a controller, a first light source, and a second light source. The method may include using a first microelectromechanical system (MEMS) mirror, directing a first signal from the first light source to an alignment tracking waveguide. The method may further include receiving by a first photosensor a first portion of the first signal via the alignment tracking waveguide and using the controller determining a first alignment indicator associated with the first portion of the first signal. The method may further include using a second MEMS mirror, directing a second signal from the second light source to the alignment tracking waveguide. The method may further include receiving by a second photosensor a second portion of the second signal via the alignment tracking waveguide and using the controller determining a second alignment indicator associated with the second portion of the second signal.

In another example, the present disclosure relates to a device including an alignment tracking waveguide. The device may further include a first display module assembly (DMA) comprising a first light source and a first microelectromechanical system (MEMS) mirror configured to direct a first signal from the first light source to the alignment tracking waveguide. The device may further include a second DMA comprising a second light source and a second MEMS mirror configured to direct a second signal from the second light source to the alignment tracking waveguide. The device may further include a first photosensor configured to receive a first portion of the first signal via the alignment tracking waveguide. The device may further include a second photosensor configured to receive a second portion of the second signal via the alignment tracking waveguide. The device may further include a controller configured to determine a first alignment indicator associated with the first portion of the first signal and a second alignment indicator associated with the second portion of the second signal.

In another example, the present disclosure relates to a method in a device comprising a controller, a first light source, and a second light source. The method may include using a first microelectromechanical system (MEMS) mirror, scanning a first signal received from the first light source. The method may further include using a first diffraction optical element (DOE) coupling the first signal to a first display waveguide to generate a first reflected signal. The method may further include using a second DOE coupling the first reflected signal received via the first display waveguide to an alignment tracking waveguide. The method may further include receiving by a first photosensor a first portion of the first reflected signal via the alignment tracking waveguide and using the controller determining a first alignment indicator associated with the first portion of the first reflected signal. The method may further include using a second MEMS mirror, scanning a second signal received from the second light source. The method may further include using a third DOE coupling the second signal to a second display waveguide to generate a second reflected signal. The method may further include using a fourth DOE coupling the second reflected signal received via the second display waveguide to the alignment tracking waveguide. The method may further include receiving by a second photosensor a second portion of the second reflected signal via the alignment tracking waveguide and using the controller determining a second alignment indicator associated with the second portion of the second reflected signal.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Examples described in this disclosure relate to addressing misalignment problems in display systems, including mixed reality or virtual reality systems. As an example, a mixed reality system or a virtual reality system may render an image for viewing by the left eye of the user and another image for viewing by the right eye of the user. Any lack of alignment between the two images may cause various problems for the user, including a blurry image, headache, or an inferior user experience. The lack of alignment between the two images may be created due to various reasons. For example, the manufacturing variations and the shifting of components inside the device over time due to physical shocks or temperature variations may cause the misalignment.

Certain devices incorporating the mixed reality system may be head mounted displays (HMDs). In the HMDs, the misalignment between the left image and the right image may also cause a shifting of the eye box for the HMD. This shift in the eye box may create image quality issues, including distortion and unintended color effects. Such HMDs may have stringent alignment requirements. As an example, such HMDs may require: (1) horizontal-convergence values to be less than 2 milliradians (mRads), (2) horizontal-divergence values to be less than 1.5 mRads, and (3) vertical alignment values to be less than 1.5 mRads. Moreover, rotation tolerances may be required to stay within horizontal and vertical tolerances for the extremes in the field of view. In addition, these requirements may need to be met over wide ranging thermal conditions and over a long term of usage. These requirements may be exacerbated if an inter-pupil-distance (IPD) adjustment is included in the HMD. Examples of systems and devices described in this disclosure may advantageously meet such stringent requirements.

Figure 1:
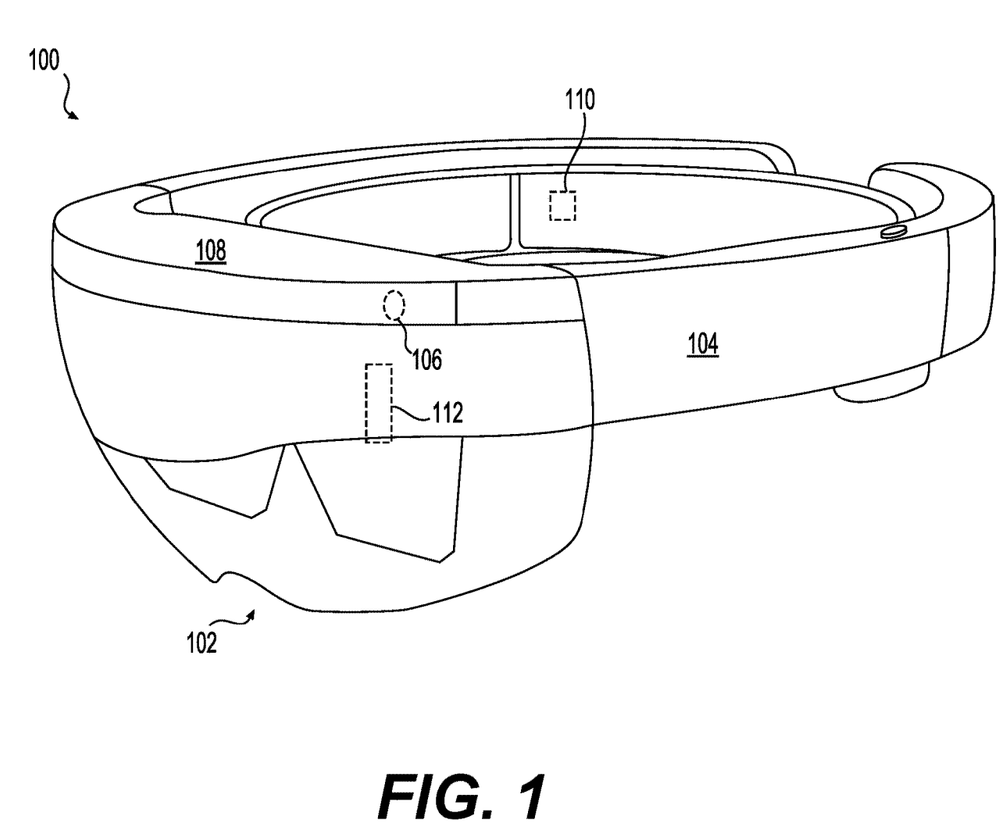
FIG. 1 shows a diagram of a device in accordance with one example.

FIG. 1 shows a diagram of a device 100 in accordance with one example. Device 100 may incorporate a display system for displaying virtual images or mixed reality images. The display system may be a direct retina scanning display suitable for displaying the images to a user of device 100. Device 100 may include a body 102 for supporting a frame 104 with a waveguide 106 and another waveguide 108. Although not shown in FIG. 1, device 100 may also include a display alignment system for addressing misalignment issues. Body 102 may further support frame 104 with a display alignment tracking waveguide (described later). Device 100 may further include display module assembly (DMA) 110 and DMA 112. In this example, DMA 110 may provide visual information to waveguide 106 and DMA 112 may provide visual information to waveguide 108. Device 100 may further include micro-displays for displaying the visual information to a user.

Each of the DMAs may emit light that is scanned such that the centroid of a pixel of the image equates to a specific angle in space. The exact angles may be defined by the orientation of the micro-display and scanning mirrors within the DMA. In one example, a first signal is provided to waveguide 106, for example, by DMA 110 and a second signal is provided to waveguide 108, for example, by DMA 112. Any discrepancies between an azimuth angle, an elevation angle, or a roll angle of the first signal provided by DMA 110 and the azimuth angle, the elevation angle, or the roll angle of the second signal provided by DMA 112 may appear to a user as misalignments of images in the first signal and second signal.

The first signal propagates through the first waveguide 106 by internal reflection within waveguide 106. The second signal propagates through waveguide 108 by internal reflection within waveguide 108. In some embodiments, the waveguide 106 and/or the waveguide 108 is a single optically transmissive layer. For example, waveguide 106 and/or waveguide 108 may be a single layer of glass. In other embodiments, waveguide 106 and/or waveguide 108 comprises a stack of waveguides. For example, waveguide 106 and/or waveguide 108 may be a stack of waveguides where each of the waveguides is configured to propagate a certain range of wavelengths.

Waveguide 106 and waveguide 108 may each include several diffraction optical elements (DOEs) positioned on the waveguide to in-couple visual information to the waveguide and outcouple visual information from the waveguide. In some embodiments, a DOE is positioned on the nasal edge (e.g., near the nose of the user) of waveguide 106 and/or waveguide 108 to in-couple visual information to the waveguide. In other embodiments, a DOE is positioned along a top edge of waveguide 106 and/or waveguide 108. In at least one embodiment, each of waveguide 106 and waveguide 108 includes a separate DOE positioned at or near the top of the nasal side of waveguide 106 and waveguide 108, respectively. One of the DOEs may sample the first signal of waveguide 106 and the other DOE may sample the second signal of waveguide 108.

Although FIG. 1 shows a certain number of components of display system 100 arranged in a certain manner, there could be more or fewer number of components arranged differently. As an example, the display system 100 may have a single DMA that is in optical communication with both the first waveguide 106 and the second waveguide 108. In such an alternative embodiment, the single DMA transmits separate signals to the separate waveguides. In addition, although not shown in FIG. 1, device 100 may include outwardly facing cameras that could capture images of the surrounding environment and the captured images may be used as part of the mixed reality.

Figure 2:
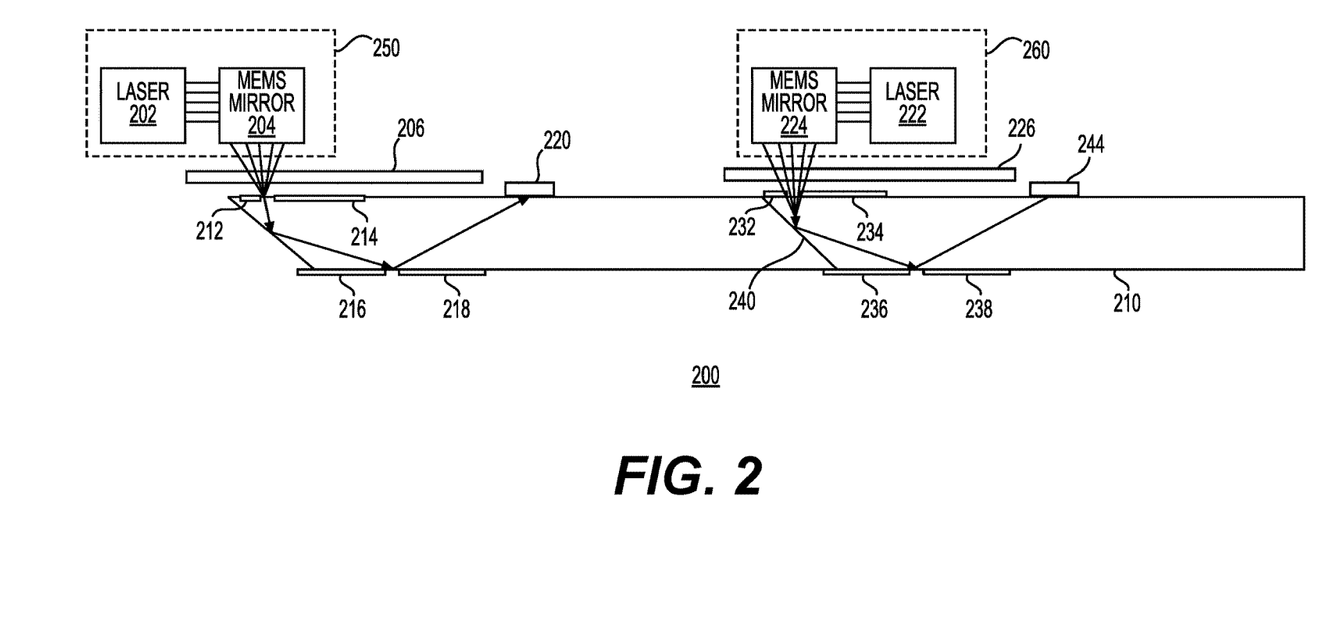
FIG. 2 shows a diagram of a display system in accordance with one example.

FIG. 2 shows a diagram of a display system 200 in accordance with one example. In this example, system 200 may be a part of device 100. System 200 may include a display alignment tracking (DAT) waveguide 210 coupled to a display module assembly (DMA) 250 and coupled to another DMA 260. System 200 further includes waveguides 206 and 226 (e.g., like waveguides 106 and 108 of FIG. 1). DMA 250 may include a laser 202, which may act as a light source, and a MEMS mirror 204. Similarly, DMA 260 may include a laser 222, which may also act as a light source, and a MEMS mirror 224. Laser 202 and Laser 222 may be a single laser or a combination of lasers, including lasers such as an infrared (IR) laser, a red laser, a blue laser, a green laser, or a combination of some of these lasers. In one example, the light sources may be the same light sources as used with device 100 for displaying images to the user of device 100. Alternatively, these may be separate light sources. The light emitted by lasers 202 and 222 may be incident upon respective MEMS mirrors. MEMS mirror 204 and 224 may be configured as scanning mirrors to scan the light beams received from respective lasers. As an example, one instance of MEMS mirror 204 may be configured to scan the light received from laser 202 along a first axis (e.g., X-axis). Another instance of MEMS mirror 204 may further be configured to scan the light received from laser 202 along a second axis (e.g., Y-axis). As described later, by controlling the frequency and the angle of scanning using a controller, MEMS mirrors 204 and 224 could be used to redirect light from the light sources in a very precise manner.

With continued reference to FIG. 2, the light redirected by the respective MEMS mirror may be received by DAT waveguide 210. In this example, the light path of the light redirected by MEMS mirror 204 may be controlled by spatial filters 212, 214, 216, and 218. The redirected light may finally be received by a photosensor 220. The light path of the light redirected by MEMS mirror 224 may be controlled by spatial filters 232, 234, 236, and 238. In addition, within DAT waveguide 210, an embedded mirror 240 may be used to redirect the light as shown in FIG. 2. The redirected light may finally be received by a photosensor 244. Each of the spatial filters may be positioned to control the light path in a manner that only light that is within a certain region and incident at certain range of angles can reach either photosensor 220 or photosensor 244. Advantageously, the use of MEMS mirrors for DAT waveguide 210 instead of other optical devices, such as prisms may result in several improvements. As an example, the size, weight, and the volume of the alignment tracking system may be reduced resulting in a more compact and lightweight device for displaying images to a user. In addition, because the alignment tracking system may be mounted closer to the front of a device, such as device 100, a heavier alignment tracking system including prisms may require weight towards the back of the device to counter-balance. The lighter alignment tracking system described herein that includes MEMS mirrors may not cause any such problems.

In addition, in one example, DAT waveguide 210 may be configured such that when the waveguide rotates, an angle of incidence of the light for the left DMA channel and the right DMA channel will substantially be the same. This may advantageously allow for a certain amount of self-compensation. In some embodiments, DAT waveguide 210 is a single optically transmissive layer. For example, DAT waveguide 210 may be a single layer of glass. In other embodiments, DAT waveguide 210 may comprise a stack of waveguides. For example, DAT waveguide 210 may be a stack of waveguides where each of the waveguides is configured to propagate a certain range of wavelengths. Although FIG. 2 shows a certain number of components of system 200 arranged in a certain manner, there could be more or fewer number of components arranged differently.

Figure 3:
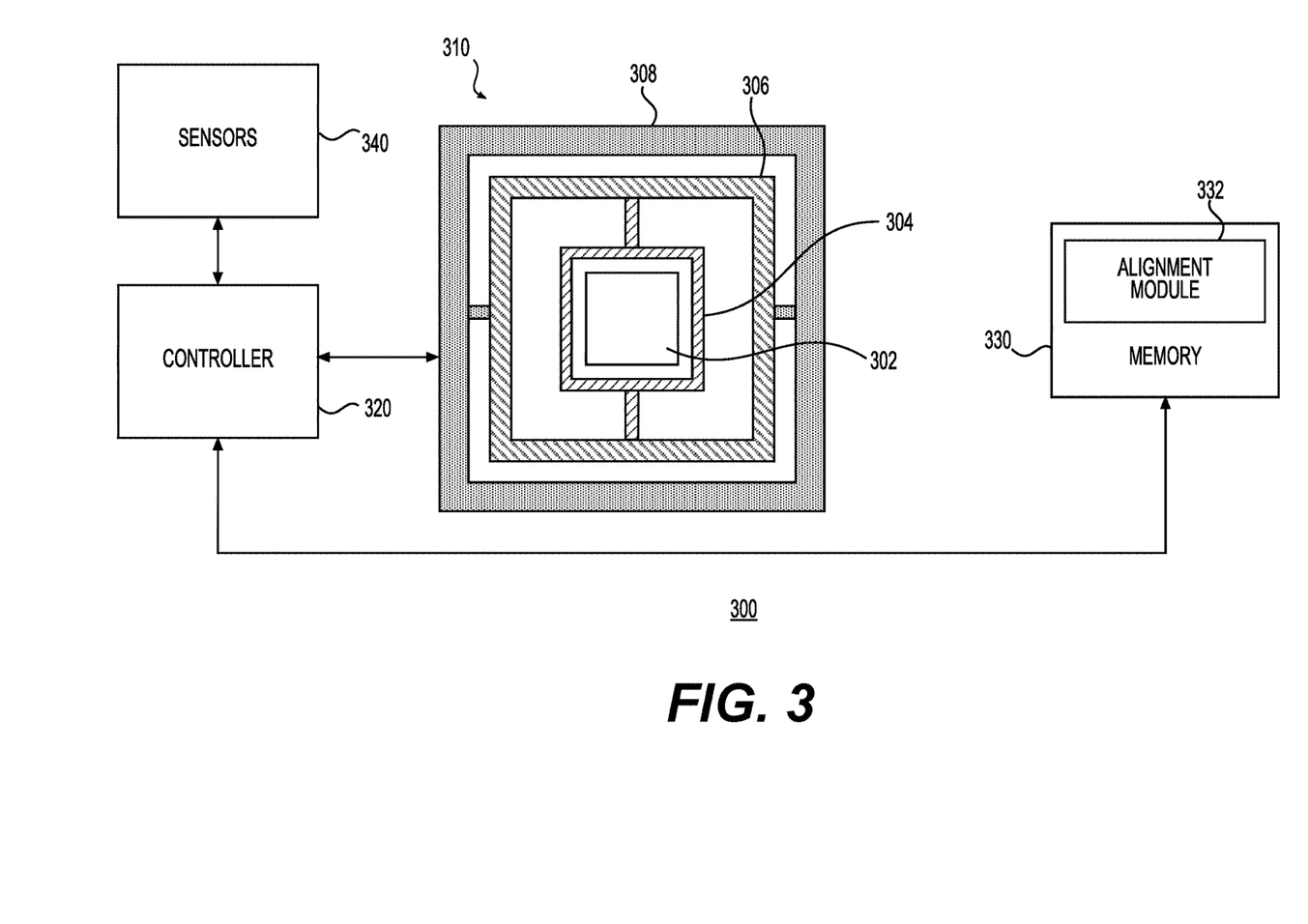
FIG. 3 shows a diagram of a system in accordance with one example.

FIG. 3 shows a diagram of system 300 in accordance with one example. In this example, system 300 may be used with system 200 for use in device 100. System 300 may include a MEMS mirror 310, a controller 320, a memory 330, and sensors 340. MEMS mirror 310 may function as a scanning mirror to scan any light beams received from any lasers. As an example, one instance of MEMS mirror 310 may be configured to scan the light received from laser 202 along a first axis (e.g., X-axis). Another instance of MEMS mirror 310 may further be configured to scan the light received from laser 202 along a second axis (e.g., Y-axis). By controlling the frequency and the angle of scanning using controller 320, MEMS mirror 310 could be used to redirect light from the light sources in a very precise manner. In this example, MEMS mirror 310 may include a mirror 302 mounted via a mounting structure 304. Mounting structure 304 may further be connected to another mounting structure 306, which may be situated on a base or substrate 308. MEMS mirror 310 may be created using techniques like the ones used in semiconductor manufacturing. The angle and the frequency at which MEMS mirror 310 operates may be controlled based on signals from controller 320. The movements of mirror 302 of MEMS mirror 310 may be the result of piezoelectric forces applied to mirror 302 via mounting structures 304 and 306. Other type of forces may also be used, including, but not limited to capacitive, magnetic, electrostatic, or other types of forces used to control MEMS. In one example, mounting structure 304 may control an angle and a frequency of the movement of mirror 302 along a first axis (e.g., X-axis) and mounting structure 306 may control an angle and a frequency of the movement of mirror 302 along a second axis (e.g., Y-axis). Although not shown in FIG. 3, MEMS mirror 310 may be mounted on an assembly that could be rotated along a third axis (e.g., Z-axis). In addition, although FIG. 3 shows MEMS mirror 310 having a certain structure, the MEMS mirror could be implemented differently to provide the scanning function.

With continued reference to FIG. 3, memory 330 may include alignment module 332. Alignment module 332 may include instructions and data structures corresponding to detecting and correcting any misalignment between an image for viewing by the left eye of the user and another image for viewing by the right eye of the user. In one example, alignment module 332 may include instructions for calibrating alignment of the left image and the right image. The calibration process may be performed: during final testing of device 100, at periodic intervals, during powering up of device 100, in response to a request from another instruction module associated with device 100, in response to a user request, user command, or user input, or in response to a mechanical shock to device 100. Sensors 340 may include an accelerometer or a similar sensor to detect any mechanical shocks (e.g., a shock caused by a user inadvertently dropping device 100). As part of the calibration process controller 320 may initiate a series of steps that may include powering up the relevant light sources (e.g., lasers 202 and 222), redirecting light from the light sources (e.g., using MEMS mirrors 204 and 224), and sensing at least a portion of the light using sensors 340 (e.g., photosensors 220 and 244). Controller 320 may be configured to control in which direction MEMS mirror 310 is pointing and store the values (e.g., angle and azimuth) in memory 330. Alignment module 332 may include data structures that may store a location in a coordinate system of the light sources (e.g., DMA 250 and DMA 260) and a location in the same coordinate system of photosensors 220 and 244. Alignment module 332 may further include instructions to calculate an angle of incidence of light at a surface of photosensors 220 and 244 based on the location information. A comparison between the direction in which MEMS mirror 310 is pointing and the angle of incidence of light on the surface of any of the photosensors may capture at least one calibrated reference alignment indicator. The alignment module 332 may include instructions to generate calibrated alignment reference indicators for both the left image and the right image (e.g., DMA 250 (e.g., for the left image) and DMA 260 (for the right image)). As noted earlier, during usage of device 100 a process like the one used for generating calibrated reference alignment indicators may be performed by controller 320 to generate alignment indicators for both the left image and the right image. Alignment module 332 may include instructions that when executed by controller 320 may compare these alignment indicators with the calibrated reference alignment indicators. Any difference in the values corresponding to these alignment indicators may indicate the degree of misalignment between the left image and the right image. Additional details of at least one way of generating calibrated reference alignment indicators and subsequent alignment indicators during the usage of device 100 are provided with respect to FIG. 4. Controller 320 along with instructions corresponding to alignment module 332 stored in memory 330 may be used to control MEMS mirrors 204 and 224 and other components shown in FIGS. 2 and 3. Although FIG. 3 shows a certain number of components of system 300 arranged in a certain manner, there could be more or fewer number of components arranged differently.

Figure 4:
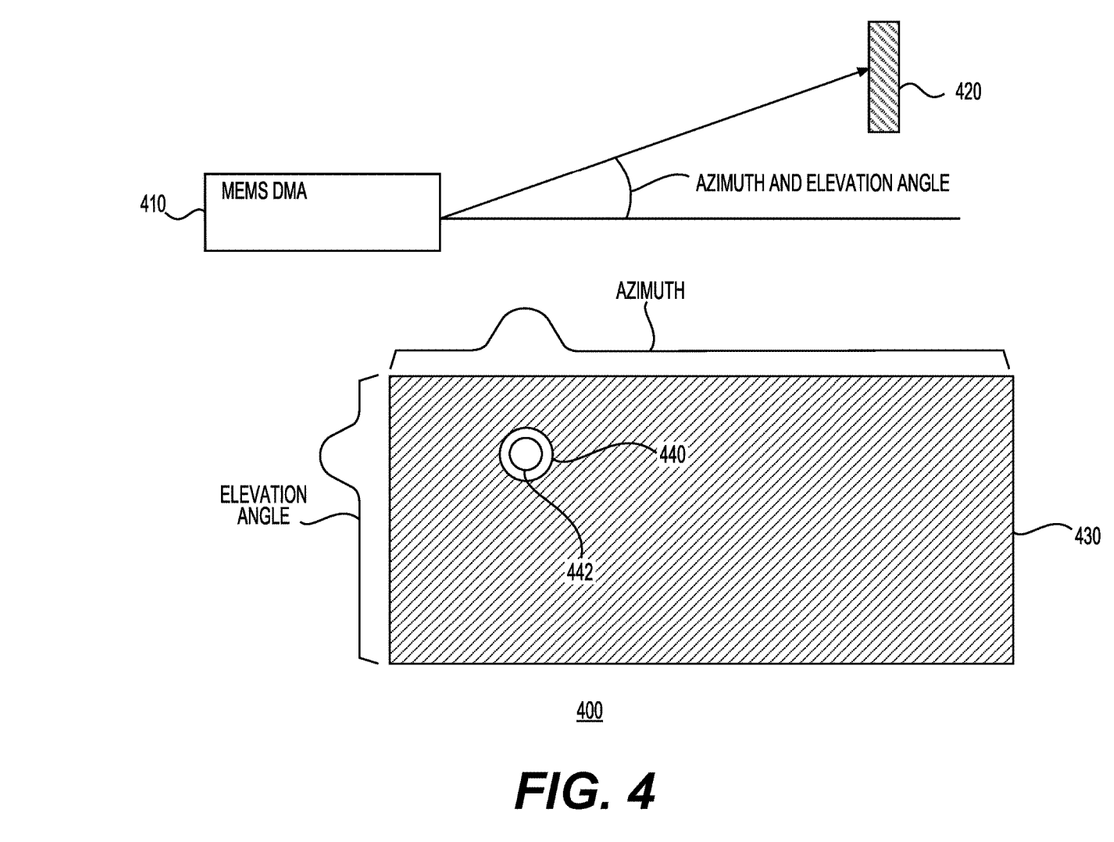
FIG. 4 shows a method for detecting any misalignment between the left image and the right image in accordance with one example.

FIG. 4 shows a method for detecting any misalignment between the left image and the right image for device 100 in accordance with one example. The azimuth and angle of the direction of light generated by a light source (e.g., MEMS DMA 410) that reaches a photosensor 420 may be known since a controller (e.g., controller 320 of FIG. 3) associated with device 100 is used to position a scanning mirror in the DMA. Controller 320 knows at almost every instant of time the direction in which the light redirected by the scanning mirror is going towards. In this example, the scanning mirror (e.g., any of the MEMS mirrors described earlier) may scan from the top left corner to the top right corner and then back to the next scanning line on the left side and so on and so forth. As the scanning mirror is scanning the light received from the light source at certain instance in time, light signal 440 may impinge on surface 430 of the photosensor. Because at this time instance, controller 320 knows the direction in which the scanning mirror is pointing, the azimuth and the elevation angle of the light signal 440 incident on the surface 430 of photosensor 420 can be detected. In this example, the first scan that results in light impinging on a surface of the photosensor may only involve a small portion of the light received by the scanning mirror. Additional light may impinge on the surface of the photosensor during scans that immediately occur after the first scan. The size and the angle of the beam of light that impinges on the surface of the photosensor may be controlled by the spatial filters. Additional spatial filters may be used to further narrow the beam of light that eventually reaches the photosensor.

Still referring to FIG. 4, the next scan may allow a larger portion of the light to impinge upon the surface of the photosensor. Thus, a centroid 442 of the light signal 440 may equate to the sub-pixel angle onto surface 430 of photosensor 420. Any change in a position of the centroid can be measured by controller 330 for both the left DMA and the right DMA when it executes the instructions corresponding to alignment module 332. This measurement may help determine alignment over usage of device 100. As an example, the photosensor for the left image and the photosensor for the right image may indicate different locations of the centroid 442 of the light signal 440. Any shift in the centroid for the left and the right photosensors may suggest misalignment. In this example, the misalignment may be corrected by controller 320 when it executes instructions corresponding to alignment module 332. The correction may include adjusting the display module assemblies to render the left and right images to compensate for the misalignment. This adjustment may be made because the left display and the right display for the user may be configured to include redundant pixels and the rendering of the images could be adjusted by allowing the rendered image to use redundant pixels. Other types of adjustments could also be made, including adjusting parameters associated with graphical processing units (GPUs) or other processors that are being used to render the images.

Figure 5:
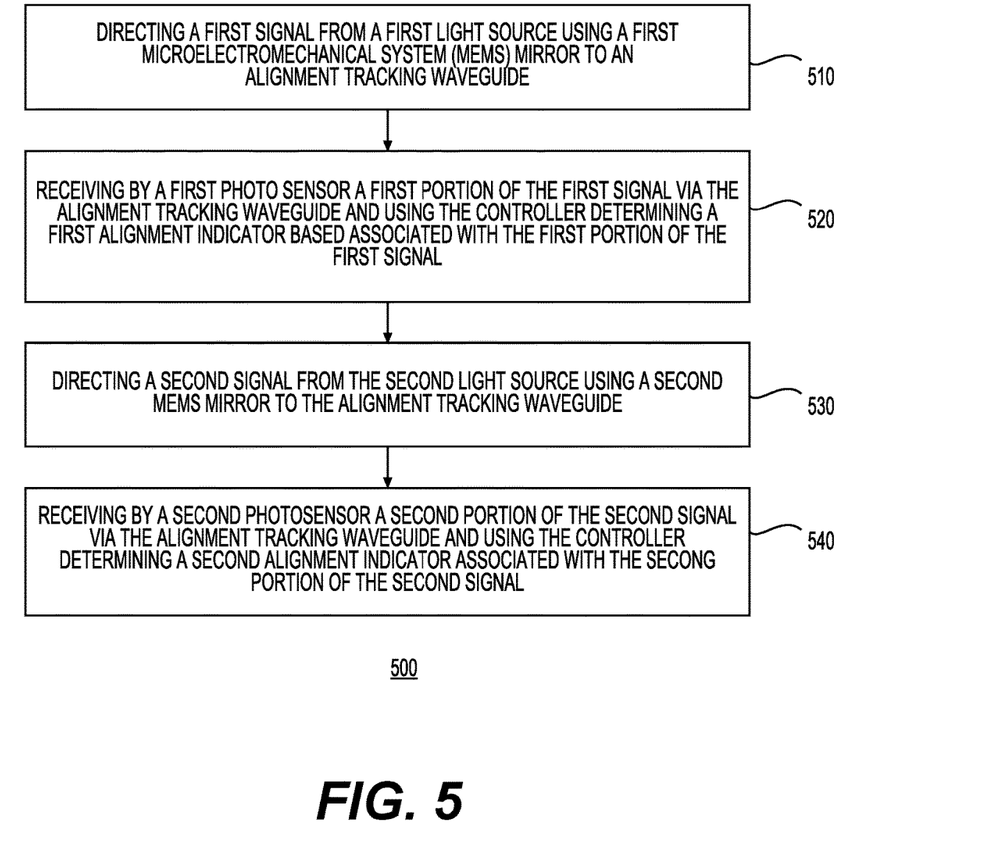
FIG. 5 shows a flow chart of a method in accordance with one example.

FIG. 5 shows a flow chart 500 showing steps of a method related to device 100 in accordance with one example. In step 510, a controller associated with the alignment system (e.g., controller 320) may direct a first signal from a first light source (e.g., laser 202) using a first MEMS mirror (e.g., MEMS mirror 204) to an alignment tracking waveguide (e.g., DAT waveguide 210).

Step 520 may include receiving by a first photosensor (e.g., photosensor 220) a first portion of the first signal via the alignment tracking waveguide (e.g., DAT waveguide 210) and determining a first alignment indicator associated with the first portion of the first signal. The first portion of the first signal may be the signal that is received after total internal reflection in the alignment tracking waveguide by the first photosensor. The first alignment indicator may be determined by controller 320 based on a first angle of incidence of the first portion of the first signal on a first surface associated with the first photosensor. Thus, as explained in FIG. 4, in one example, the angle of incidence of light on a surface of the photosensor may be determined algorithmically by controller 320. Controller 320 may also be configured to know the precise direction in which the MEMS mirrors is pointing at almost every time instance. In this example, the first alignment indicator may be determined based on a comparison as explained with respect to FIG. 5. The first alignment indicator may then be compared by controller 320 with a predetermined alignment reference indicator to generate a first alignment adjustment value.

In step 530, a controller associated with the alignment system (e.g., controller 320) may direct a second signal from a second light source (e.g., laser 222) using a second MEMS mirror (e.g., MEMS mirror 224) to the alignment tracking waveguide (e.g., DAT waveguide 210).

Step 540 may include receiving by a second photosensor (e.g., photosensor 244) a second portion of the second signal via the alignment tracking waveguide (e.g., DAT waveguide 210) and determining a second alignment indicator associated with the second portion of the second signal. The second portion of the second signal may be the signal that is received after total internal reflection in the alignment tracking waveguide by the second photosensor. The second alignment indicator may be determined by controller 320 based on a second angle of incidence of the second portion of the second signal on a second surface associated with the second photosensor. Thus, as explained in FIG. 4, in one example, the angle of incidence of light on a surface of the photosensor may be determined algorithmically by controller 320. Controller 320 may also be configured to know the precise direction in which each of the MEMS mirrors is pointing. In this example, the second alignment indicator may be determined based on a comparison as explained with respect to FIG. 5. The second alignment indicator may then be compared by controller 320 with a predetermined alignment reference indicator to generate a second alignment adjustment value. The steps described with respect to FIG. 5 need not be performed in a certain order and additional or fewer steps may be performed.

Figure 6:
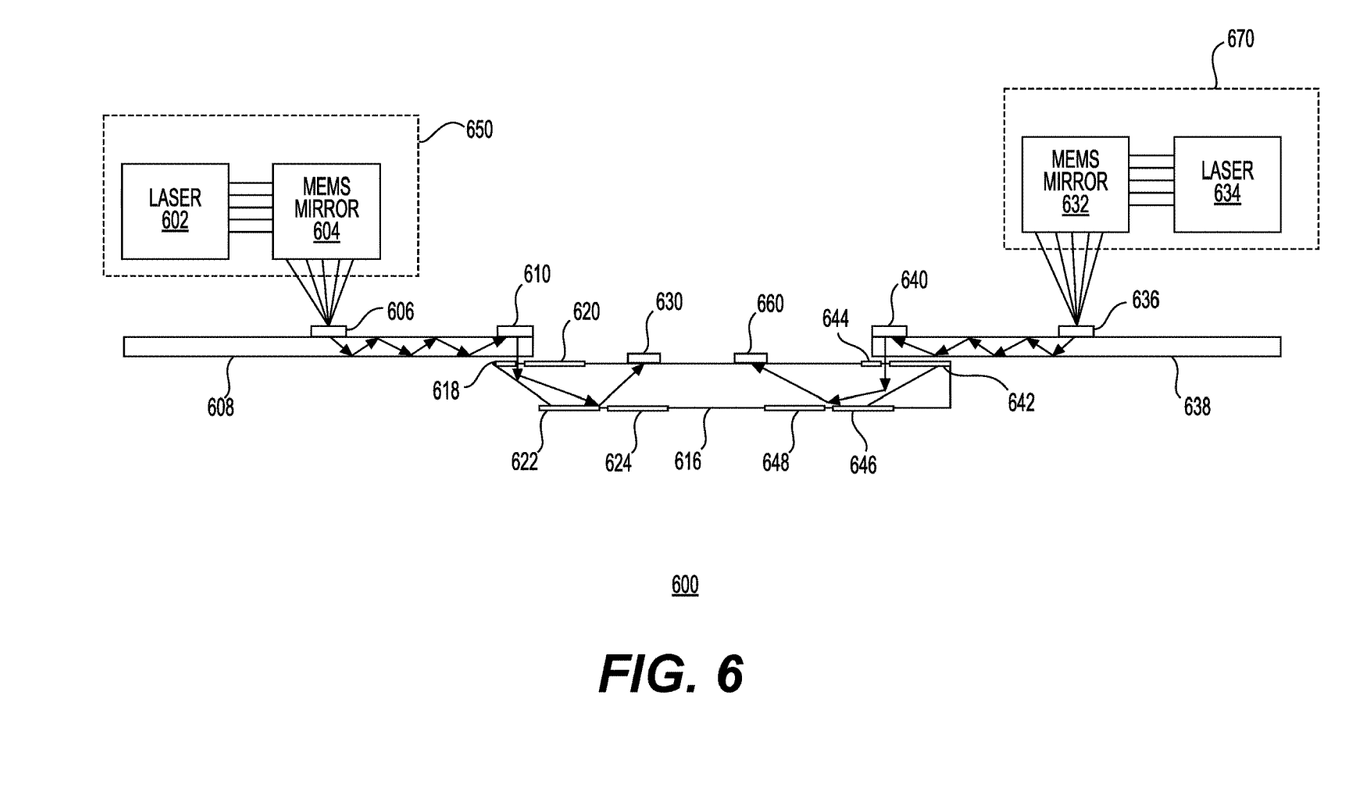
FIG. 6 shows a diagram of a display system in accordance with one example.

FIG. 6 shows a diagram of another display system 600 for use in device 100 in accordance with an example. System 600 may include a display alignment tracking (DAT) waveguide 616 coupled to a display module assembly (DMA) 650 and another DMA 670. In this example, the coupling between DAT waveguide 616 may further include display waveguides 608 and 638. Display waveguides 608 and 638 may be the ones that are used to outcouple images for the user's display as part of the normal operation of device 100. DMA 650 may include a laser 602, which may act as a light source, and a MEMS mirror 604. Similarly, DMA 670 may include a laser 634, which may also act as a light source, and a MEMS mirror 632. Laser 602 and Laser 634 may be a single laser or a combination of lasers, including lasers, such as an infrared (IR) laser, a red laser, a blue laser, or a green laser. In one example, the light sources may be the same light sources as used with device 100 for displaying images to the user of device 100. Alternatively, these may be separate light sources. The light emitted by lasers 602 and 622 may be incident upon respective MEMS mirrors. MEMS mirror 604 and 632 may be configured as scanning mirrors to scan the light beams received from respective lasers. As an example, MEMS mirror 604 may be configured to scan the light received from laser 602 along a first axis (e.g., X-axis). MEMS mirror 632 may further be configured to scan the light received from laser 634 along a second axis (e.g., Y-axis). As described earlier, by controlling the frequency and the angle of scanning using a controller, MEMS mirrors 604 and 632 could be used to redirect light from the light sources in a very precise manner.

With continued reference to FIG. 6, the light redirected by MEMS mirror 604 may be received by display waveguide 608 via a diffractive optical element (DOE) 606. DOE 606 may be a grating or another optical element for coupling the light to display waveguide 608. In one example, DOE 606 may be a grating that is printed on a surface of display waveguide 608. The light may travel via total internal reflection inside display waveguide 608 and may be coupled via another DOE 610 to DAT waveguide 616. Similarly, the light redirected by MEMS mirror 634 may be received by display waveguide 638 via a diffractive optical element (DOE) 636. DOE 636 may be a grating or another optical element for coupling the light to display waveguide 638. In one example, DOE 636 may be a grating that is printed on a surface of display waveguide 638. The light may travel via total internal reflection inside display waveguide 638 and may be coupled via another DOE 640 to DAT waveguide 616.

In this example, the light path of the light redirected by MEMS mirror 604 may be controlled by spatial filters 618, 620, 622, and 624 inside DAT waveguide 616. The redirected light may finally be received by a photosensor 630. The light path of the light redirected by MEMS mirror 632 may be controlled by spatial filters 642, 644, 646, and 648. The redirected light may finally be received by a photosensor 660. Each of the spatial filters may be positioned to control the light path in a manner that only light that is within a certain region and incident at certain range of angles can reach either photosensor 630 or photosensor 660.

In addition, in one example, DAT waveguide 616 may be configured such that when it rotates, an angle of incidence of the light for the left DMA channel and the right DMA channel will substantially be the same. This may advantageously allow for a certain amount of self-compensation. In some embodiments, DAT waveguide 616 is a single optically transmissive layer. For example, DAT waveguide 616 may be a single layer of glass. In other embodiments, DAT waveguide 616 may comprise a stack of waveguides. For example, DAT waveguide 616 may be a stack of waveguides where each of the waveguides is configured to propagate a certain range of wavelengths.

Controller 320 along with instructions corresponding to alignment module 332 stored in memory 330 may be used to control MEMS mirrors 604 and 632 and other components shown in FIGS. 3 and 6. In addition, the steps described in relation to the method corresponding to FIG. 5 may also be performed using system 600 in a similar fashion as described earlier. Although FIG. 6 shows a certain number of components of system 600 arranged in a certain manner, there could be more or fewer number of components arranged differently.

Figure 7:
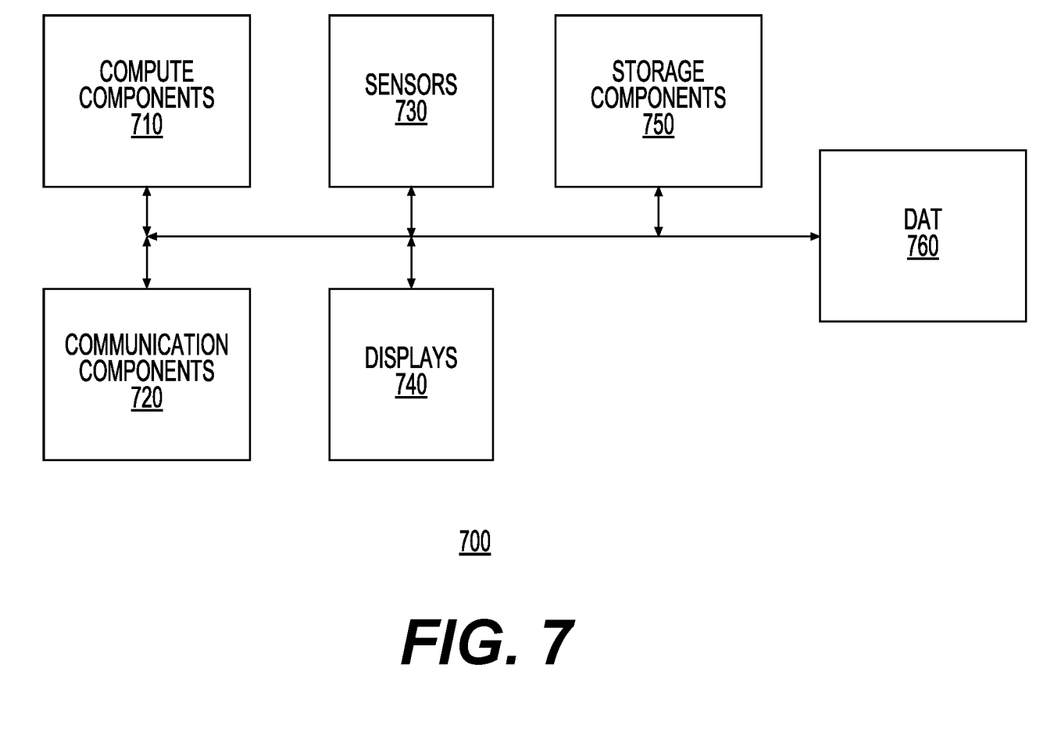
FIG. 7 shows a system for displaying images to a user in accordance with one example.

FIG. 7 shows a system 700 for device 100 that may be used to display images to a user. System 700 may include various components interconnected via busses or other links. System 700 may include compute components 710, communication components 720, sensors 730, displays 740, storage components 750, and display alignment tracking (DAT) 760. Compute components 710 may include processors, controllers, CPUs, GPUs, Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. These components may execute instructions accessible to them to implement the functionality associated with device 100. Communication components 720 may include wired or wireless network components, including Ethernet, Bluetooth, Wi-Fi, cellular (e.g., GSM, CDMA, 3G/4G/5G/LTE), ultra-wide band (UWB), infrared, ultrasonic, or other components to allow communication with other devices.

With continued reference to FIG. 7, sensors 730 may include accelerometers, gyroscopes, radars, photosensors, hall effect sensors, force detectors, proximity sensors, and other types of sensors. Displays 740 may be direct retina scanning displays for displaying the images to a user of device 100. Storage components may include non-volatile memory and/or volatile memory. Non-volatile memory may include, for example, a hard disk, a solid-state drive, an optical disk or tape, a flash memory, an EPROM, NVRAM, PRAM, or other such media, or networked versions of such media. Volatile memory may include, for example, dynamic memory such as DRAM, SRAM, a cache, or other such media.

Still referring to FIG. 7, DAT 760 may include the components as arranged in the examples shown in FIG. 2 or FIG. 6. DAT 760 may further include components shown in FIG. 3, including a controller and instructions associated with the controller for tracking or monitoring alignment of the left and right images.

Figure 8:
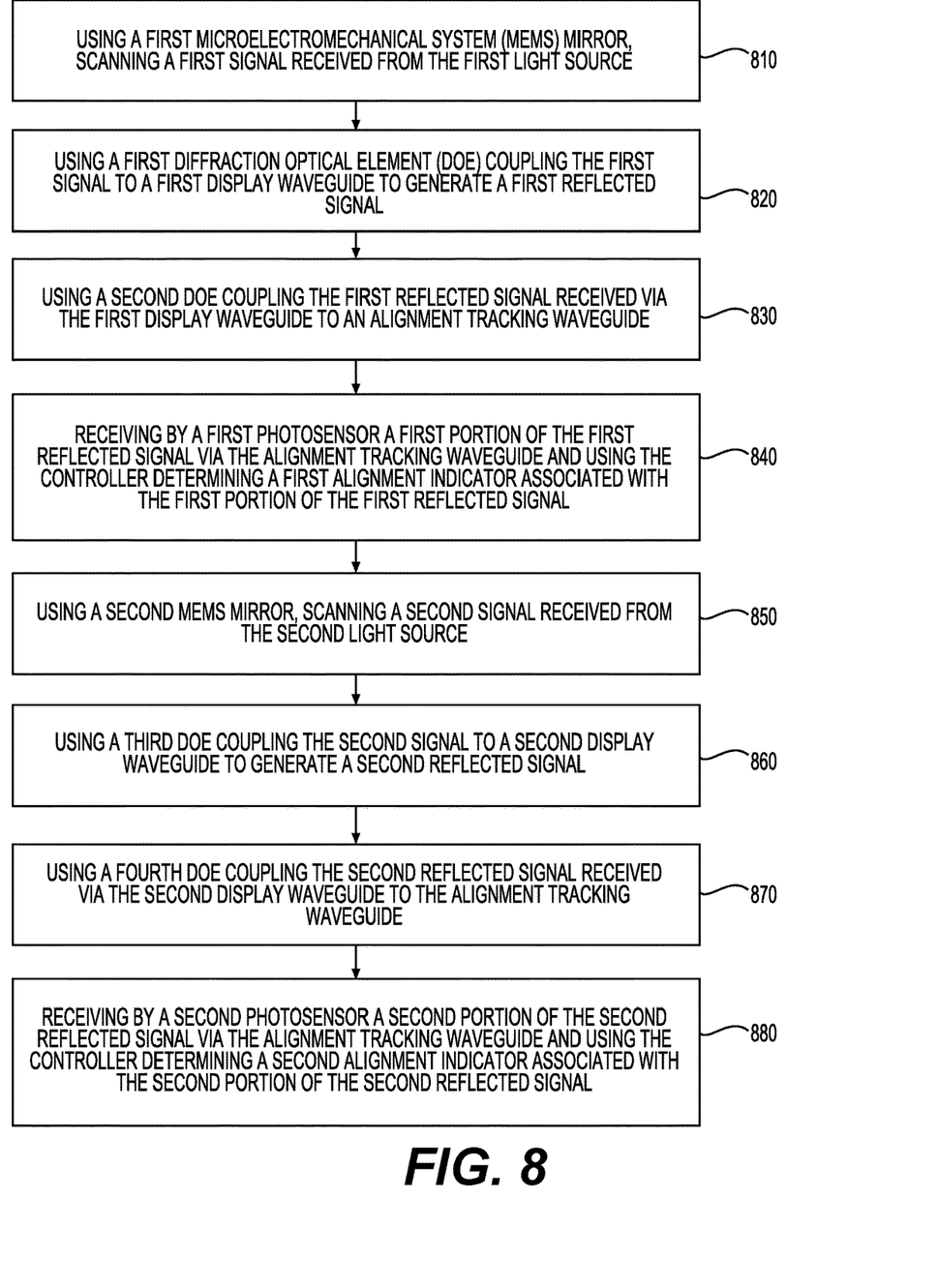
FIG. 8 shows a flow chart of a method in accordance with one example.

FIG. 8 shows a flow chart showing steps of a method related to device 100 in accordance with one example. In one example, this method may be performed when device 100 incorporates display system 600 of FIG. 6. In step 810, a first MEMS mirror (e.g., MEMS mirror 604) may scan a first signal received from a first light source (e.g., laser 602). In step 820, a first diffraction optical element (DOE) (e.g., DOE 606) may couple the first signal to a first display waveguide (e.g., display waveguide 608) to generate a first reflected signal (e.g., the reflected signal may be the first signal reflected by total internal reflection within display waveguide 608). In step 830, a second DOE (e.g., DOE 610) may couple the first reflected signal to an alignment tracking waveguide (e.g., DAT waveguide 616).

Step 840 may include receiving by a first photosensor (e.g., photosensor 630) a first portion of the first reflected signal via the alignment tracking waveguide (e.g., DAT waveguide 616) and using a controller determining a first alignment indicator associated with the first portion of the first reflected signal. The first portion of the first reflected signal may be the signal that is received after total internal reflection in the alignment tracking waveguide by the first photosensor. The first alignment indicator may be determined by controller 320 based on a first angle of incidence of the first portion of the first signal on a first surface associated with the first photosensor. Thus, as explained in FIG. 4, in one example the angle of incidence of light on a surface of the photosensor may be determined algorithmically by controller 320. Controller 320 may also be configured to know precise direction in which the MEMS mirrors is pointing. In this example, the first alignment indicator may be determined based on a comparison as explained with respect to FIG. 5. The first alignment indicator may then be compared by controller 320 with a predetermined alignment reference indicator to generate a first alignment adjustment value.

In step 850, a second MEMS mirror (e.g., MEMS mirror 632) may scan a second signal received from a second light source (e.g., laser 634). In step 860, a third DOE (e.g., DOE 636) may couple the second signal to a second display waveguide (e.g., display waveguide 638) to generate a second reflected signal (e.g., the reflected signal may be the second signal reflected by total internal reflection within display waveguide 638). In step 870, a second DOE (e.g., DOE 640) may couple the first reflected signal to an alignment tracking waveguide (e.g., DAT waveguide 616).

Step 880 may include receiving by a second photosensor (e.g., photosensor 660) a second portion of the second reflected signal via the alignment tracking waveguide (e.g., DAT waveguide 616) and using a controller determining a second alignment indicator associated with the second portion of the second reflected signal. The second portion of the second reflected signal may be the signal that is received after total internal reflection in the alignment tracking waveguide by the second photosensor. The second alignment indicator may be determined by controller 320 based on a second angle of incidence of the second portion of the second signal on a second surface associated with the second photosensor. Thus, as explained in FIG. 4, in one example, the angle of incidence of light on a surface of the photosensor may be determined algorithmically by controller 320. Controller 320 may also be configured to know the precise direction in which each of the MEMS mirrors is pointing. In this example, the second alignment indicator may be determined based on a comparison as explained with respect to FIG. 5. The second alignment indicator may then be compared by controller 320 with a predetermined alignment reference indicator to generate a second alignment adjustment value. The steps described with respect to FIG. 8 need not be performed in a certain order and additional or fewer steps may be performed.

In conclusion, the present disclosure relates to a method in a device comprising a controller, a first light source, and a second light source. The method may include using a first microelectromechanical system (MEMS) mirror, directing a first signal from the first light source to an alignment tracking waveguide. The method may further include receiving by a first photosensor a first portion of the first signal via the alignment tracking waveguide and using the controller determining a first alignment indicator associated with the first portion of the first signal. The method may further include using a second MEMS mirror, directing a second signal from the second light source to the alignment tracking waveguide. The method may further include receiving by a second photosensor a second portion of the second signal via the alignment tracking waveguide and using the controller determining a second alignment indicator associated with the second portion of the second signal.

The first alignment indicator may be determined based on a first angle of incidence of the first portion of the first signal on a first surface associated with the first photosensor, and the second alignment indicator may be determined based on a second angle of incidence of the second portion of the second signal on a second surface associated with the second photosensor. The method may further include comparing the first alignment indicator to a first predetermined alignment reference indicator to generate a first alignment adjustment value and comparing the second alignment reference indicator to a second predetermined reference indicator to generate a second alignment adjustment value. The method may further include adjusting a rendering of the first signal based on the first alignment adjustment value and adjusting a rendering of the second signal based on the second alignment adjustment value.

The first alignment indicator may be determined based on a first angle of incidence of the first portion of the first signal on a first surface associated with the first photosensor and a direction of the first signal after it is directed by the first MEMS mirror, and the second alignment indicator may be determined based on a second angle of incidence of the second portion of the second signal on a second surface associated with the second photosensor and a direction of the second signal after it is directed by the second MEMS mirror. The method may further include at least partially compensating for any misalignment between a rendering of the first signal and a rendering of the second signal based on the first alignment adjustment value and the second alignment adjustment value. Each of the first MEMS mirror and the second MEMS mirror may comprise a scanning mirror.

In another example, the present disclosure relates to a device including an alignment tracking waveguide. The device may further include a first display module assembly (DMA) comprising a first light source and a first microelectromechanical system (MEMS) mirror configured to direct a first signal from the first light source to the alignment tracking waveguide. The device may further include a second DMA comprising a second light source and a second MEMS mirror configured to direct a second signal from the second light source to the alignment tracking waveguide. The device may further include a first photosensor configured to receive a first portion of the first signal via the alignment tracking waveguide. The device may further include a second photosensor configured to receive a second portion of the second signal via the alignment tracking waveguide. The device may further include a controller configured to determine a first alignment indicator associated with the first portion of the first signal and a second alignment indicator associated with the second portion of the second signal.

The first alignment indicator may be determined based on a first angle of incidence of the first portion of the first signal on a first surface associated with the first photosensor, and the second alignment indicator may be determined based on a second angle of incidence of the second portion of the second signal on a second surface associated with the second photosensor. The controller may be further configured to compare the first alignment indicator to a first predetermined alignment reference indicator to generate a first alignment adjustment value and compare the second alignment reference indicator to a second predetermined reference indicator to generate a second alignment adjustment value. The controller may be further configured to adjust a rendering of the first signal based on the first alignment adjustment value and adjust a rendering of the second signal based on the second alignment adjustment value.

The first alignment indicator may be determined based on a first angle of incidence of the first portion of the first signal on a first surface associated with the first photosensor and a direction of the first signal after it is directed by the first MEMS mirror, and the second alignment indicator may be determined based on a second angle of incidence of the second portion of the second signal on a second surface associated with the second photosensor and a direction of the second signal after it is directed by the second MEMS mirror. The controller may be further configured to at least partially compensate for any misalignment between a rendering of the first signal and a rendering of the second signal based on the first alignment adjustment value and the second alignment adjustment value. Each of the first MEMS mirror and the second MEMS mirror may comprise a scanning mirror.

In another example, the present disclosure relates to a method in a device comprising a controller, a first light source, and a second light source. The method may include using a first microelectromechanical system (MEMS) mirror, scanning a first signal received from the first light source. The method may further include using a first diffraction optical element (DOE) coupling the first signal to a first display waveguide to generate a first reflected signal. The method may further include using a second DOE coupling the first reflected signal received via the first display waveguide to an alignment tracking waveguide. The method may further include receiving by a first photosensor a first portion of the first reflected signal via the alignment tracking waveguide and using the controller determining a first alignment indicator associated with the first portion of the first reflected signal. The method may further include using a second MEMS mirror, scanning a second signal received from the second light source. The method may further include using a third DOE coupling the second signal to a second display waveguide to generate a second reflected signal. The method may further include using a fourth DOE coupling the second reflected signal received via the second display waveguide to the alignment tracking waveguide. The method may further include receiving by a second photosensor a second portion of the second reflected signal via the alignment tracking waveguide and using the controller determining a second alignment indicator associated with the second portion of the second reflected signal.

The first alignment indicator may be determined based on a first angle of incidence of the first portion of the first signal on a first surface associated with the first photosensor, and the second alignment indicator may be determined based on a second angle of incidence of the second portion of the second signal on a second surface associated with the second photosensor. The method may further include comparing the first alignment indicator to a first predetermined alignment reference indicator to generate a first alignment adjustment value and comparing the second alignment reference indicator to a second predetermined reference indicator to generate a second alignment adjustment value. The method may further include adjusting a rendering of the first signal based on the first alignment adjustment value and adjusting a rendering of the second signal based on the second alignment adjustment value.

The first alignment indicator may be determined based on a first angle of incidence of the first portion of the first signal on a first surface associated with the first photosensor and a direction of the first signal after it is directed by the first MEMS mirror, and the second alignment indicator may be determined based on a second angle of incidence of the second portion of the second signal on a second surface associated with the second photosensor and a direction of the second signal after it is directed by the second MEMS mirror. The method may further include at least partially compensating for any misalignment between a rendering of the first signal and a rendering of the second signal based on the first alignment adjustment value and the second alignment adjustment value.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method in a device comprising a controller, a first light source, and a second light source, the method comprising:

using a first microelectromechanical system (MEMS) mirror, directing a first signal from the first light source to an alignment tracking waveguide;

receiving by a first photosensor a first portion of the first signal via the alignment tracking waveguide and using the controller determining a first alignment indicator associated with the first portion of the first signal based on a first angle of incidence of the first portion of the first signal on a first surface;

using a second MEMS mirror, directing a second signal from the second light source to the alignment tracking waveguide; and receiving by a second photosensor a second portion of the second signal via the alignment tracking waveguide and using the controller determining a second alignment indicator associated with the second portion of the second signal based on a second angle of incidence of the second portion of the second signal on a second surface.

2. The method of claim 1, wherein the first surface is associated with the first photosensor, and wherein the second surface is associated with the second photosensor.

3. The method of claim 1 further comprising comparing the first alignment indicator to a first predetermined alignment reference indicator to generate a first alignment adjustment value and comparing the second alignment reference indicator to a second predetermined reference indicator to generate a second alignment adjustment value.

4. The method of claim 3 further comprising adjusting a rendering of the first signal based on the first alignment adjustment value and adjusting a rendering of the second signal based on the second alignment adjustment value.

5. The method of claim 1, wherein the first alignment indicator is determined based at least on a direction of the first signal after it is directed by the first MEMS mirror, and wherein the second alignment indicator is determined based at least on a direction of the second signal after it is directed by the second MEMS mirror.

6. The method of claim 3 further comprising at least partially compensating for any misalignment between a rendering of the first signal and a rendering of the second signal based on the first alignment adjustment value and the second alignment adjustment value.

7. The method of claim 1, wherein each of the first MEMS mirror and the second MEMS mirror comprises a scanning mirror.

8. A device comprising:
an alignment tracking waveguide;
a first display module assembly (DMA) comprising a first light source and a first microelectromechanical system (MEMS) mirror configured to direct a first signal from the first light source to the alignment tracking waveguide;
a second DMA comprising a second light source and a second MEMS mirror configured to direct a second signal from the second light source to the alignment tracking waveguide;
a first photosensor configured to receive a first portion of the first signal via the alignment tracking waveguide;
a second photosensor configured to receive a second portion of the second signal via the alignment tracking waveguide; and
a controller configured to determine a first alignment indicator associated with the first portion of the first signal based on a first angle of incidence of the first portion of the first signal on a first surface and a second alignment indicator associated with the second portion of the second signal based on a second angle of incidence of the second portion of the second signal on a second surface.

9. The device of claim 8, wherein the first surface is associated with the first photosensor, and wherein the second surface is associated with the second photosensor.

10. The device of claim 8, wherein the controller is further configured to compare the first alignment indicator to a first predetermined alignment reference indicator to generate a first alignment adjustment value and compare the second alignment reference indicator to a second predetermined reference indicator to generate a second alignment adjustment value.

11. The device of claim 10, wherein the controller is further configured to adjust a rendering of the first signal based on the first alignment adjustment value and adjust a rendering of the second signal based on the second alignment adjustment value.

12. The device of claim 8, wherein the first alignment indicator is determined based at least on a direction of the first signal after it is directed by the first MEMS mirror, and wherein the second alignment indicator is determined based at least on a direction of the second signal after it is directed by the second MEMS mirror.

13. The device of claim 10, wherein the controller is further configured to at least partially compensate for any misalignment between a rendering of the first signal and a rendering of the second signal based on the first alignment adjustment value and the second alignment adjustment value.

14. The device of claim 8, wherein each of the first MEMS mirror and the second MEMS mirror comprises a scanning mirror.

15. A method in a device comprising a controller, a first light source, and a second light source, the method comprising:
using a first microelectromechanical system (MEMS) mirror, scanning a first signal received from the first light source;
using a first diffraction optical element (DOE) coupling the first signal to a first display waveguide to generate a first reflected signal;
using a second DOE coupling the first reflected signal received via the first display waveguide to an alignment tracking waveguide;
receiving by a first photosensor a first portion of the first reflected signal via the alignment tracking waveguide and using the controller determining a first alignment indicator associated with the first portion of the first reflected signal based on a first angle of incidence of the first portion of the first reflected signal on a first surface;
using a second MEMS mirror, scanning a second signal received from the second light source;
using a third DOE coupling the second signal to a second display waveguide to generate a second reflected signal;
using a fourth DOE coupling the second reflected signal received via the second display waveguide to the alignment tracking waveguide; and
receiving by a second photosensor a second portion of the second reflected signal via the alignment tracking waveguide and using the controller determining a second alignment indicator associated with the second portion of the second reflected signal based on a second angle of incidence of the second portion of the second reflected signal on a second surface.

16. The method of claim 15, wherein the first surface is associated with the first photosensor, and wherein the second surface is associated with the second photosensor.

17. The method of claim 15 further comprising comparing the first alignment indicator to a first predetermined alignment reference indicator to generate a first alignment adjustment value and comparing the second alignment reference indicator to a second predetermined reference indicator to generate a second alignment adjustment value.

18. The method of claim 17 further comprising adjusting a rendering of the first signal based on the first alignment adjustment value and adjusting a rendering of the second signal based on the second alignment adjustment value.

19. The method of claim 15, wherein the first alignment indicator is determined based at least on a direction of the first signal after it is directed by the first MEMS mirror, and wherein the second alignment indicator is determined based at least on a direction of the second signal after it is directed by the second MEMS mirror.

20. The method of claim 17 further comprising at least partially compensating for any misalignment between a rendering of the first signal and a rendering of the second signal based on the first alignment adjustment value and the second alignment adjustment value.

* * * * *